United States Patent
May

(10) Patent No.: US 12,063,575 B2
(45) Date of Patent: Aug. 13, 2024

(54) SYSTEM, METHOD, AND COMPUTER PROGRAM FOR UNIFIED MESSAGING PLATFORM DEPLOYED ON EPHEMERAL MESH NETWORK

(71) Applicant: Amdocs Development Limited, Limassol (CY)

(72) Inventor: Pavel Yefim May, Rishon leZion (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 202 days.

(21) Appl. No.: 17/238,062

(22) Filed: Apr. 22, 2021

(65) Prior Publication Data
US 2022/0345855 A1 Oct. 27, 2022

(51) Int. Cl.
 H04W 4/12 (2009.01)
 H04L 51/56 (2022.01)
 H04W 4/02 (2018.01)
 H04W 84/18 (2009.01)

(52) U.S. Cl.
 CPC ............... *H04W 4/12* (2013.01); *H04L 51/56* (2022.05); *H04W 4/023* (2013.01); *H04W 84/18* (2013.01)

(58) Field of Classification Search
 CPC ....... H04W 4/14; H04W 4/023; H04W 84/18; H04L 51/56
 See application file for complete search history.

(56) References Cited

U.S. PATENT DOCUMENTS

| | | | | |
|---|---|---|---|---|
| 10,762,434 | B2* | 9/2020 | Solotorevsky | G06N 20/00 |
| 2004/0221043 | A1* | 11/2004 | Su | H04W 4/06 |
| | | | | 709/227 |
| 2008/0031203 | A1* | 2/2008 | Bill | H04W 8/005 |
| | | | | 370/338 |
| 2010/0208662 | A1* | 8/2010 | Fuste Vilella | H04W 40/00 |
| | | | | 370/328 |
| 2013/0035114 | A1* | 2/2013 | Holden | H04W 4/025 |
| | | | | 455/456.3 |
| 2014/0244568 | A1* | 8/2014 | Goel | H04L 67/12 |
| | | | | 706/46 |
| 2017/0223118 | A1* | 8/2017 | Nishikawa | H04L 51/222 |
| 2018/0314707 | A1* | 11/2018 | Nguyen | H04W 4/023 |
| 2019/0215753 | A1 | 7/2019 | Sathya et al. | |

(Continued)

OTHER PUBLICATIONS

International Search Report and Written Opinion from PCT Application No. PCT/IB2022/053622, dated Jul. 8, 2022.

(Continued)

*Primary Examiner* — Steven S Kelley
(74) *Attorney, Agent, or Firm* — Zilka-Kotab, P.C.

(57) ABSTRACT

As described herein, a system, method, and computer program are provided for a unified messaging platform deployed on an ephemeral mesh network. A first mobile device identifies an environment category to which the first mobile device is registered is identified. The first mobile device detects a second mobile device that is within a connectivity range of the first mobile device and that is registered to the environment category. The first mobile device establishes a connection with a decentralized ad-hoc mesh network via the second mobile device. The first mobile device uses a unified messaging protocol associated with the decentralized ad-hoc mesh network to communicate with at least the second mobile device.

19 Claims, 8 Drawing Sheets

(56) References Cited

U.S. PATENT DOCUMENTS

| | | | |
|---|---|---|---|
| 2020/0252365 A1* | 8/2020 | Peltier | G06F 16/316 |
| 2021/0126891 A1* | 4/2021 | Salter | G06F 16/31 |
| 2021/0201346 A1* | 7/2021 | Dejardins | H04L 67/55 |

OTHER PUBLICATIONS

Anonymous, "FireChat," Wikipedia, Feb. 13, 2021, 4 pages, Retrieved from https://en.wikipedia.org/wiki/FireChat.

Anonymous, "Briar (software)," Wikipedia, Mar. 29, 2021, 3 pages, retrieved from https://en.wikipedia.org/wiki/Briar_ (software).

Anonymous, "Bridgefy," Wikipedia, Apr. 12, 2021, 3 pages, retrieved from https://en.wikipedia.org/wiki/Bridgefy.

Anonymous, "Smartphone ad hoc network," Wikipedia, Dec. 8, 2020, 4 pages, retrieved from https://en.wikipedia.org/wiki/Smartphone_ad_hoc_network.

Anonymous, "5G," Wikipedia, Apr. 13, 2021, 23 pages, retrieved from https://en.wikipedia.org/wiki/5G.

Anonymous, "6G (network)," Wikipedia, Apr. 22, 2021, 4 pages, retrieved from https://en.wikipedia.org/wiki/6G_ (network).

Anonymous, "Federated learning," Wikipedia, Apr. 12, 2021, 11 pages, retrieved from https://en.wikipedia.org/wiki/Federated_learning.

Anonymous, "Knowledge base," Wikipedia, Mar. 17, 2021, 4 pages, retrieved from https://en.wikipedia.org/wiki/Knowledge_base.

Anonymous, "List of cluster management software," Wikipedia, Mar. 30, 2021, 2 pages, retrieved from https://en.wikipedia.org/wiki/List_of_cluster_management_software.

Anonymous, "The Serval Project Wiki," Serval, Mar. 4, 2018, 2 pages, retrieved from http://developer.servalproject.org/dokuwiki/doku.php.

Anonymous, "WiFi direct—what it is and how it works," Apr. 22, 2021, 10 pages, retrieved from https://www.netspotapp.com/what-is-wifi-direct.html.

Anonymous, "About Commotion," Apr. 22, 2021, 3 pages, retrieved from https://commotionwireless.net/about/.

Ernst et al., "RightMesh, A Decentralized Mobile Mesh Networking Platform Powered by Blockchain Technology and Tokenization," RightMesh, Mar. 19, 2018, 53 pages, retrieved from https://neironix.io/documents/whitepaper/4443/RightMesh_WP5.pdf.

Anonymous, "Application protocol providing Reactive Streams semantics," RSocket, Apr. 22, 2021, 5 pages, retrieved from https://rsocket.io/.

Shankland, "Wi-Fi 6 will upgrade your workhorse wireless network," CNET, Aug. 27, 2019, 10 pages, retrieved from https://www.cnet.com/news/wi-fi-6-will-upgrade-your-workhorse-wireless-network/.

Anonymous, "Sonnet: Revolutionary communications device for the adventurer in all of us," Sonnet Labs, Apr. 22, 2021, 4 pages, retrieved from https://www.sonnetlabs.com/.

Anonymous, "goTennaPRO Military," goTenna PRO, Apr. 22, 2021, 3 pages, retrieved from https://gotennapro.com/pages/use-case-military.

Simonite, "Build Your Own Internet with Mobile Mesh Networking," MIT Technology Review, Jul. 9, 2013, 10 pages, retrieved from.

Anonymous, "Serval Mesh Extender," The Serval Project Wiki, Aug. 21, 2017, 1 page, retrieved from http://developer.servalproject.org/dokuwiki/doku.php?id=content:meshextender:main_page.

* cited by examiner

SYSTEM, METHOD, AND COMPUTER PROGRAM FOR UNIFIED MESSAGING PLATFORM DEPLOYED ON EPHEMERAL MESH NETWORK

FIELD OF THE INVENTION

The present invention relates to the creation and functioning of wireless mesh networks.

BACKGROUND

Wireless networking has become almost ubiquitous. Almost, because there is no appropriate platform for networking between wireless devices in proximity with one another when in an occasional environment. As a result, owners of personal wireless devices still cannot communicate with other owners in close proximity unless both devices are already connected to the same pre-existing wireless network.

While some existing solutions have attempted to address this problem, primarily by creating ad-hoc networks, these solutions involve only unstructured text messaging. There is thus a need for addressing these and/or other issues associated with the prior art.

SUMMARY

As described herein, a system, method, and computer program are provided for a unified messaging platform deployed on an ephemeral mesh network. A first mobile device identifies an environment category to which the first mobile device is registered is identified. The first mobile device detects a second mobile device that is within a connectivity range of the first mobile device and that is registered to the environment category. The first mobile device establishes a connection with a decentralized ad-hoc mesh network via the second mobile device. The first mobile device uses a unified messaging protocol associated with the decentralized ad-hoc mesh network to communicate with at least the second mobile device.

DETAILED DESCRIPTION

Figure 1:
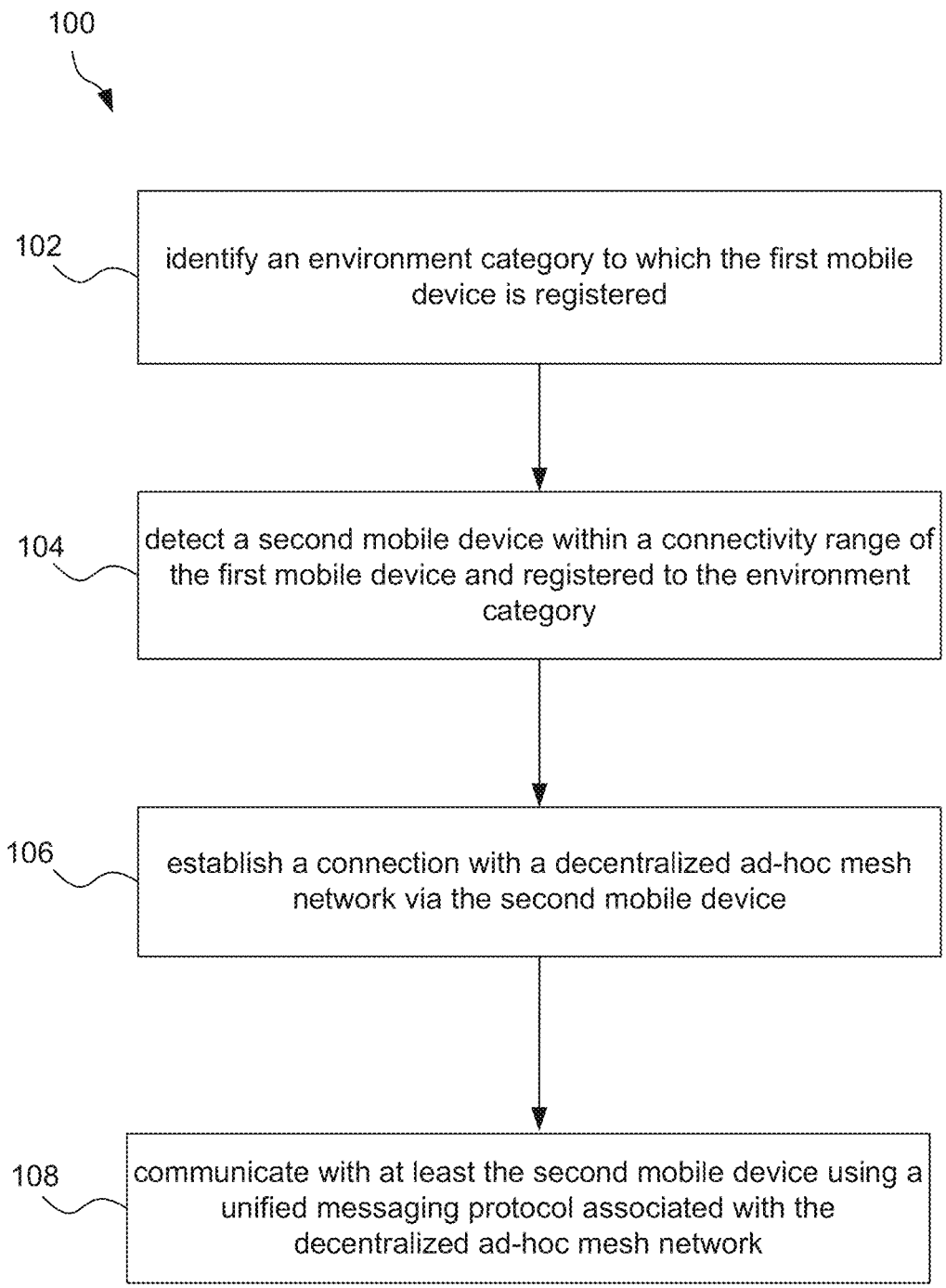
FIG. 1 illustrates a flowchart of a method for unified messaging on an ephemeral mesh network, in accordance with one embodiment.

FIG. 1 illustrates a flowchart of a method 100 for unified messaging on an ephemeral mesh network, in accordance with one embodiment. The method 100 is performed by a mobile device (referred to below as a "first mobile device") capable of communicating with at least one other mobile device. The mobile device may be equipped to communicate wirelessly, such as over Wi-Fi, Bluetooth, cellular network, etc. The mobile device may also include a mesh networking stack configured to perform the operations of the method 100. Various exemplary embodiments of mobile devices are described below with reference to FIGS. 7 and/or 8, and may include mobile phones or Internet of Things (IoT) devices.

In operation 102, an environment category to which the first mobile device is registered is identified. In one embodiment, the environment category may be one of a plurality of predefined environment categories. For example, the plurality of predefined environment categories may include at least one of a highway, a hotel, a restaurant, a school, or a neighborhood. In another embodiment, the first mobile device may be registered to the environment category upon selection of the environment category by a user of the first mobile device (e.g. via a user interface of the mobile device). The first mobile device may be registered to the environment category as a way to define which "community", or network, of mobile devices the first mobile device would like to connect to.

In operation 104, a second mobile device that is within a connectivity range of the first mobile device and that is registered to the environment category is detected. Besides being within the connectivity range of the first mobile device and registered to the same environment category as the first mobile device, the second mobile device is any mobile device capable of communicating wirelessly with the first mobile device (e.g. via Wi-Fi, Bluetooth, cellular network, etc.). Similar to the first mobile device, the second mobile device may also include the mesh networking stack.

The connectivity range of the first mobile device may depend on the wireless technology in use by the first mobile device. In other words, the second mobile device may be within a wireless range of the first mobile device. The second mobile device may be registered to the environment category in a manner that is similar to the registration performed by the first mobile device, as described above. The mesh networking stack of the first mobile device may be configured to be able to detect that the second mobile device is within the connectivity range of the first mobile device and that the second mobile device is registered to the same environment category as the first mobile device.

In operation 106, a connection with a decentralized ad-hoc (i.e. ephemeral) mesh network is established via the second mobile device. The decentralized ad-hoc mesh network refers to a network, possibly temporary, created among mobile devices within some proximity to one another, that does not rely on a central server or other central control device. The decentralized ad-hoc mesh network may rely on any wireless technology or any combination of wireless technologies, such as Wi-Fi, Bluetooth and a range extender, and/or broadband cellular network coverage.

The connection with the decentralized ad-hoc mesh network may be created by virtue of a connection being made with the second mobile device. In one embodiment where the second mobile device is not already connected to a decentralized ad-hoc mesh network, the decentralized ad-hoc mesh network may be created when the first mobile device connects to the second mobile device. In another embodiment where the second mobile device is already connected to the decentralized ad-hoc mesh network, the first mobile device may be connected to the decentralized ad-hoc mesh network through the second mobile device.

In one exemplary embodiment, the second mobile device may be a mobile device within the decentralized ad-hoc mesh network that is in closest proximity to the first mobile device. In this embodiment, upon establishing the connection with the decentralized ad-hoc mesh network via the second mobile device, the first mobile device may receive from the second mobile device historical data associated with the ad-hoc mesh network, receive geolocation data for each other mobile device within the ad-hoc mesh network, and send its geolocation data to each other mobile device within the ad-hoc mesh network.

In operation 108, a unified messaging protocol associated with the decentralized ad-hoc mesh network is used to communicate with at least the second mobile device. In other words, the first mobile device may communicate with the second mobile device using the unified messaging protocol, and may optionally also communicate with other mobile devices connected to the decentralized ad-hoc mesh network (e.g. directly or through the second mobile device) using the unified messaging protocol. The unified messaging protocol may be configured within the mesh networking stack, in one embodiment.

In one embodiment, the unified messaging protocol may include a unified messaging format. The unified messaging format my require, for each message, an indication of certain information. For example, the unified messaging format my require a message to indicate a relevant environment category, attributes of the message sender, an address of each message receiver, a message type, and a message content.

In another embodiment, the unified messaging protocol may support unified messaging functionality. The unified messaging functionality may be customized for the environment category or may be common across all environment categories. For example, the unified messaging functionality may include asking a question to other mobile devices in the decentralized ad-hoc mesh network, sending a notification to other mobile devices in the decentralized ad-hoc mesh network, sending a recommendation to other mobile devices in the decentralized ad-hoc mesh network, rating a recommendation received from other mobile devices in the decentralized ad-hoc mesh network, and/or sending a knowledge-based query to other mobile devices in the decentralized ad-hoc mesh network. In other examples, the unified messaging functionality may include presenting recommendations received from other mobile devices in the decentralized ad-hoc mesh network, presenting a map of geolocations of other mobile devices in the decentralized ad-hoc mesh network, and/or presenting messaging features from persisted messages utilizing machine supervised and unsupervised machine learning.

The communication with at least the second mobile device may include any messaging between the first mobile device and the second mobile device, and optionally between the first mobile device and other mobile device connected to the decentralized ad-hoc mesh network and registered to the environment category. In one embodiment, communicating with at least the second mobile device may include sending, by the first mobile device, a point-to-multipoint multicast message to all other mobile devices registered to the environment category. In another embodiment, communicating with at least the second mobile device may include sending, by the first mobile device, a point-to-point unicast message to the second mobile device or another mobile device registered to the environment category, as uniquely identified by a specified attribute.

To this end, the method 100 may be performed to connect the first mobile device to the decentralized ad-hoc/ephemeral mesh network that corresponds to the selected environment category, and further to enable unified messaging with other mobile devices on that decentralized ad-hoc/ephemeral mesh network. While the method 100 is described above with respect to a single selected environment category, it should be noted that the first mobile device may be capable of being registered to a plurality of different environment categories and accordingly connected to a plurality of different decentralized ad-hoc mesh networks corresponding to the plurality of different environment categories.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
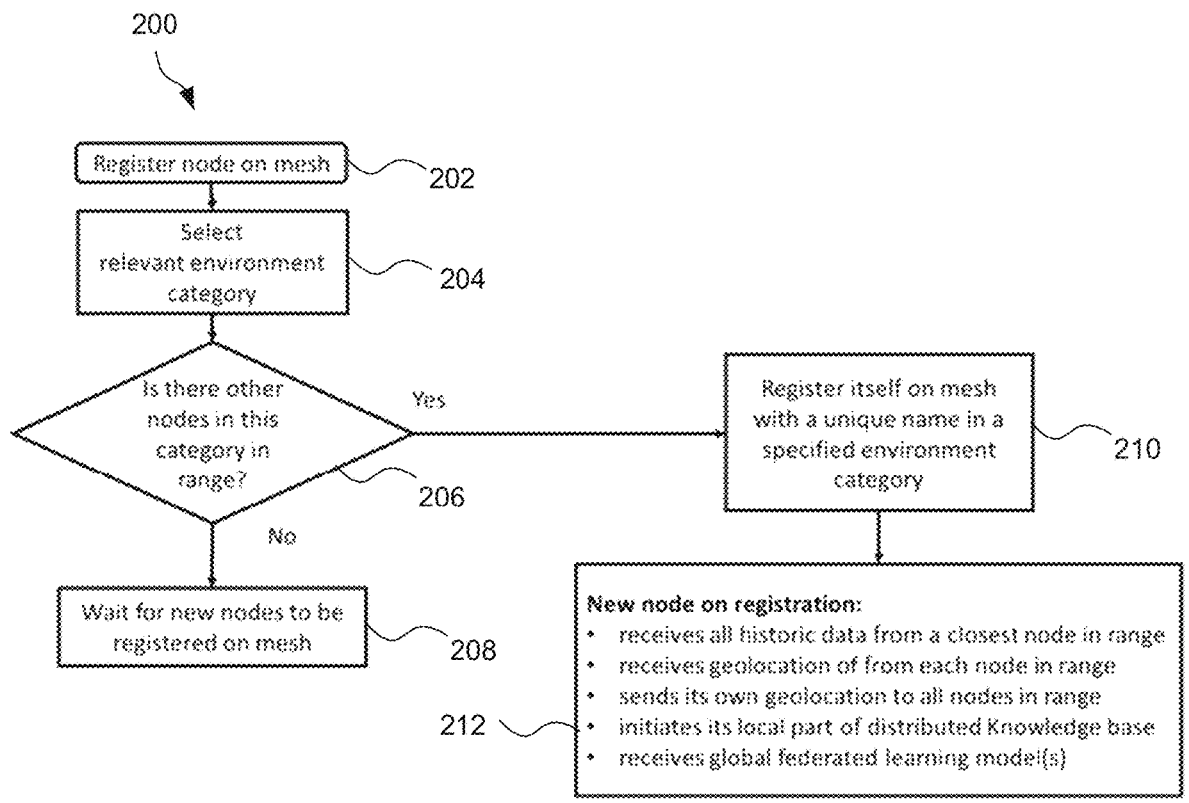
FIG. 2 illustrates a flowchart of a method for registering a new node on an ephemeral mesh network, in accordance with one embodiment.

FIG. 2 illustrates a flowchart of a method 200 for registering a new node on an ephemeral mesh network, in accordance with one embodiment. As an option, the method 200 may be carried out in the context of the details of the previous figure and/or any subsequent figure(s). For example, the method 200 may be carried out by the first mobile device described above with reference to FIG. 1. In particular, the method 200 may be carried out by a mesh networking stack of the first mobile device. Of course, however, the method 200 may be implemented in the context of any desired environment. Further, the aforementioned definitions may equally apply to the description below.

In operation 202, a prompt to register a new node (e.g. the first mobile device) on an ephemeral mesh network is received. The prompt may be received through a user interface of the node. The prompt indicates an.

In operation 204, selection of a relevant environment category is received. The selection may be made through the user interface of the node. The selected environment category identifies which ephemeral mesh network the node would like to be registered to. The environment category may be selected from a plurality of predefined environment categories, such as those listed in Table 1.

TABLE 1

| | |
|---|---|
| 1. | Highway |
| 2. | Natural disasters or terrorist incidents where existing network infrastructure is overloaded, destroyed, or compromised |
| 3. | Hotel |
| 4. | Café |
| 5. | Office |
| 6. | Hospital |
| 7. | School or University |
| 8. | Neighborhood |
| 9. | Large scale public event: |
| a. | Demonstration |
| b. | Festival |
| c. | Outdoor concert |
| d. | Tourist group excursion |
| 10. | Sightseeing location |
| 11. | Auditory, conference hall, concert or theater hall, club, etc. |
| 12. | Plane, train, tram, bus, metro, cruise ship, any other crowded transport vehicle |
| 13. | Airport, train station, bus station, etc. |
| 14. | Outdoor game |
| 15. | Custom private category |

In decision 206, it is determined whether there is another node that is within a connectivity range (i.e. of the new node) and that is registered to the selected environment category. When it is determined that there is not another node that is both within the connectivity range and registered to the selected environment category, the method 200 waits for other new nodes to be registered to the ephemeral mesh network (see operation 208), until it can be determined that there is another node that is both within the connectivity range and registered to the selected environment category.

When it is determined that there is another node (e.g. the second mobile device) that is both within the connectivity range and registered to the selected environment category, the new node registers itself with a unique name in the ephemeral mesh network corresponding to the selected environment category (see operation 210). The other node may be a node with a closest proximity to the new node.

Responsive to the registration, the new node sends/receives various information to/from other nodes in the ephemeral mesh network. In one embodiment, the new node may receive all historic data from a closest node in range, which may be calculated as per a maximum of power of signal or a minimal distance using geolocation of the nodes. The historic data may include prior messages transmitted over the ephemeral mesh network, such as broadcasted messages, recommendations, ratings, notifications, etc. The new node may receive a geolocation of each node in a connectivity range of the new node or each node within the ephemeral mesh network. The new node may send its own geolocation to all nodes in the range or within the ephemeral mesh network. The new node may initiate its local part of a distributed knowledge base. The new node may receive global federated learning model(s). To this end, the new node may be registered on all mesh nodes in the ephemeral mesh network through the closest node in the selected environment category.

By this design, the ephemeral mesh network may be a self-organized and self-configured network that does not have a central entity for network management or data persistence. All data may be replicated to all nodes or group of nodes in connectivity range, as mentioned above, to provide no single point of failure. Point-to-point (i.e. node-to-node) messages may optionally be persisted only on the corresponding two points.

In one embodiment, when a node leaves a connectivity range of the ephemeral mesh network, the node may continue to be registered on the ephemeral mesh network until a defined timeout occurs. If the node returns to the connectivity range of the ephemeral mesh network before this timeout is expired, the node may get current historic data from a closest node in range (e.g. calculated as per the maximum of power of signal or the minimal distance using the node geolocation). Point-to-point messages sent to an inactive destination node (i.e. that is not in connectivity range of the ephemeral mesh network) may be accumulated by the sender and then resent to destination node once the node becomes active on (i.e. within connectivity range of) the ephemeral mesh network. Additionally, when the node returns to the ephemeral mesh network after the timeout is expired, then the node can be registered on all mesh nodes as a new node as described in method 200. Thus, an inactive node may be purged from the list of active nodes in the ephemeral mesh network after a timeout occurs.

Optionally, each node may be capable of being registered in the ephemeral mesh networks corresponding to multiple different environment categories at the same time. This may be accomplished by repeating the method 200 for each of the different environment categories.

As another option, each node may repeat method 200 to switch connections among ephemeral mesh networks based on the changing environment of the node. The mesh network stack mentioned above may serve all available environment categories. Upon selection of an environment category by a node (per the node's current environment), the mesh network stack may detect other nearby wireless devices in the same environment, where all wireless devices serve as wireless access points to the ephemeral mesh network.

In one use case scenario, during the day a wireless device may constantly change environment, for example:
1) Driving in traffic on highway (Highway category)
2) Then becoming a guest in hotel (Hotel category)
3) Then flying in a plane (Plane category)
4) Then driving once more (Highway category)
5) Then sitting in café (Café category)
6) Then driving once more (Highway category)
7) Then resting at home (Neighborhood category)

Using the mesh networking stack, the wireless device can switch to a relevant environment category and thus become able to send and get messages relevant to the relevant environment category and display user interfaces specific to the relevant environment category.

Figure 3:
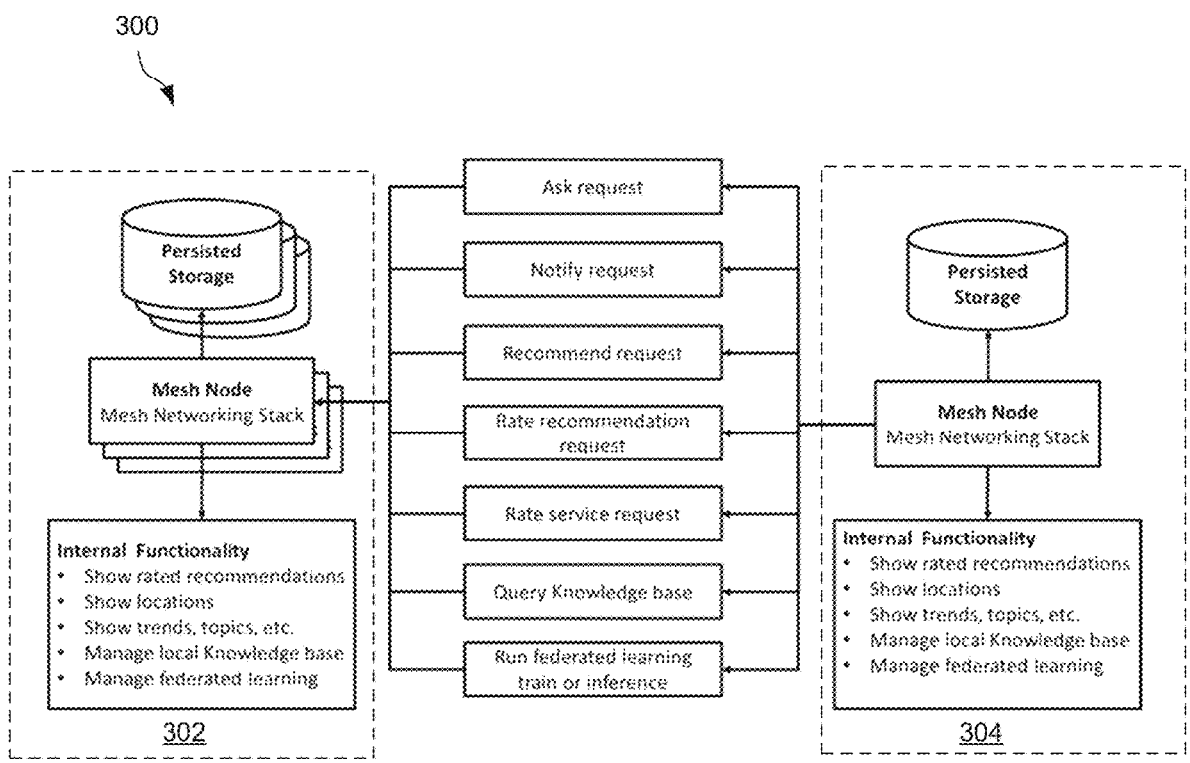
FIG. 3 illustrates a block diagram of internal functionality and dataflow between two nodes in an ephemeral mesh network, in accordance with one embodiment.

FIG. 3 illustrates a block diagram of internal functionality and dataflow 300 between two nodes in an ephemeral mesh network, in accordance with one embodiment. As an option, the internal functionality and dataflow 300 may be implemented in the context of the details of the previous figure and/or any subsequent figure(s). For example, the internal functionality and dataflow 300 may be provided upon registration of the nodes in the ephemeral mesh network (e.g. per the method 200 of FIG. 2). Of course, however, the internal functionality and dataflow 300 may be implemented in the context of any desired environment. Further, the aforementioned definitions may equally apply to the description below.

As shown, a first node 302 (e.g. first mobile device) and a second node 304 (e.g. second mobile device) are registered to an ephemeral mesh network and are capable of communicating over the ephemeral mesh network. It should be noted that are multiple options for communication between wireless devices in the ephemeral mesh network:
1. No apparatus besides wireless devices is available— Only Wi-Fi is available to support communication between phones. In such a case communication will work up to 100 meters for Wi-Fi 5 and up to 200 meters for Wi-Fi 6 between each node.
2. Wireless range extender is available—Bluetooth is used for communication between wireless device and range extender. Currently communication up to 4 miles is available.
3. A hybrid swarm of wireless devices comprised of two sub swarms: one beyond broadband cellular network coverage and one with broadband cellular network coverage (internet access points, 4G, 5G, 6G, etc.).

A specialized protocol may be required to emulate REST or any other available application layer protocol to be able to transfer command and data from one wireless device to another using any available cellular network including Wi-Fi as well as broadband cellular network (4G, 5G, 6G, etc.).

The nodes in the ephemeral mesh network each include a locally stored mesh network stack that enables functionality in association with the ephemeral mesh network, including use a unified message protocol to communicate with one another within the ephemeral mesh network and to perform functions in association with the ephemeral mesh network.

The unified message protocol includes a unified message format that enables the nodes to communicate with one another within the ephemeral mesh network. The unified message format may be used for all messages transmitted within any ephemeral mesh network corresponding to any environment category. Of course, custom message formats may also be defined for select environment categories, as an option. Table 2 illustrates the message fields that may be required by unified message format.

TABLE 2

| | | |
|---|---|---|
| 1. | Category | |
| 2. | Sender properties | |
| a. | Nickname | |
| b. | Wireless device MAC address that uniquely identifies a mesh node | |
| c. | Geolocation coordinates | |
| d. | Other relevant attributes | |
| 3. | Receiver addresses (one or list of many) | |
| 4. | Message type: | |
| a. | Broadcast to all | |
| b. | Broadcast to a group limited by distance range or number of hops or any other attribute | |
| c. | Point-to-point | |
| 5. | Message content - any combination of the following media: | |
| a. | Text | |
| b. | Picture | |
| c. | Video | |
| d. | Audio | |
| e. | Contact | |
| f. | Geolocation | |
| g. | Knowledge base query | |
| h. | Federated learning request | |

The unified message protocol may support a plurality of different types of messages, such as:
1) Point-to-multipoint multicast messages sent from one node and received by all nodes.
2) Point-to-multipoint multicast messages sent from one node and received by a group of nodes limited by a parameter (e.g. distance range, number of hops from sender node to destination node, or any other attribute).
3) Point-to-point unicast message sent from one node to another uniquely specified node (e.g. specified by name, location or any other attribute).

The unified message protocol includes unified message functionality that enables the nodes to perform functions in association with the ephemeral mesh network. The unified message functionality may be used for any ephemeral mesh network corresponding to any environment category. Of course, custom functionality may also be defined for select environment categories, as an option. Table 3 illustrates the functionality that may be supported by unified message protocol.

TABLE 3

| | | |
|---|---|---|
| | External functionality: | |
| 1. | Ask question: | |
| a. | all nodes | |
| b. | a group of nodes | |
| 2. | Notify all nodes or group of nodes: | |
| a. | on the node location | |
| b. | on alert event | |
| c. | on any topic | |
| 3. | Recommend to: | |
| a. | all nodes | |
| b. | group of nodes | |

TABLE 3-continued

| | | |
|---|---|---|
| 4. | Rate a recommendation (notification, advice, sightseeing, location, news, etc.) | |
| 5. | Rate a service (Hotel, café, plane, train, etc.) | |
| 6. | Knowledge base query | |
| 7. | Federated learning train request | |
| 8. | Federated learning inference request | |
| | Internal functionality: | |
| 1. | Show recommendations with bubble-up recommendation rank (see the related definition below) | |
| 2. | Show a map of geolocations of mesh nodes as per mesh setting: | |
| a. | Anonymously | |
| b. | With nicknames | |
| 9. | Show messaging features from persisted messages for last hour, day, week, month utilizing machine supervised and unsupervised learning: | |
| a. | Trends | |
| b. | Topics | |
| c. | Sentiment opinions | |
| d. | Emotions | |

It should be noted that the decentralized mesh network is an open one and therefore can be vulnerable to undesired messages. Accordingly, as an option, each node can block messages coming from any other node within the decentralized mesh network. Also, if a number of blocks of the same node exceeds a defined threshold number, that node can be blocked for the entire network temporarily or indefinitely.

A blockchain consensus mechanism may be used to decentralize the validation of sent messages, filtering out unacceptable messages, performing auditing and thus counting each nodes reputation. For example, having in mind that internet protocol (IP) addresses in open decentralized mesh networks are not available, blockchain may be used as a security model for unique node identification and transfer of data between nodes. Blockchain with a ledger, distributed between mesh nodes, cryptography, and tokenization technologies would not require a centralized trusted third party that decides upon the blockchain ledger's content. The node reputation is a threshold combined from a number of blocks of the node and a number of unacceptable messages, and therefore can be used for excluding the node from the messaging loop based on the node media access control (MAC) address.

Figure 4:
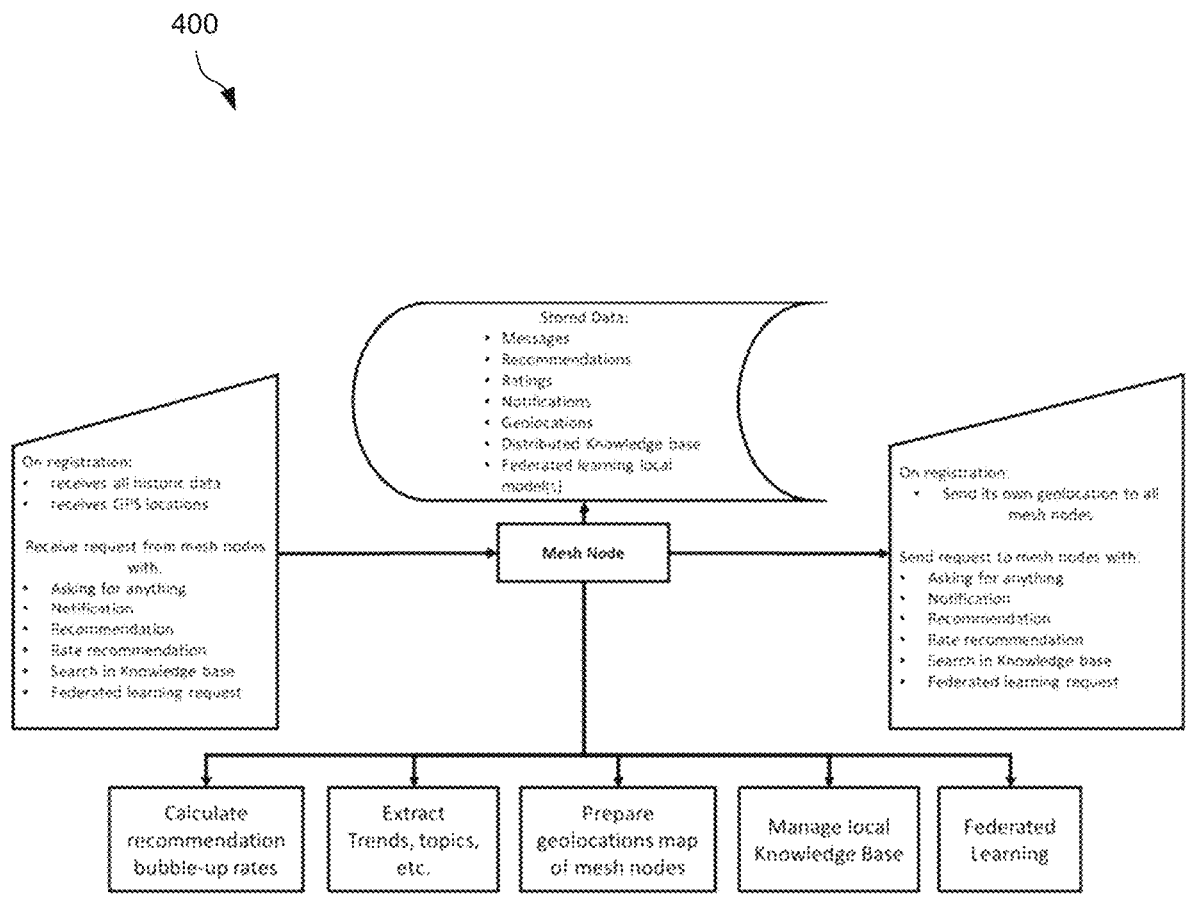
FIG. 4 illustrates a block diagram of the functionality of a node in an ephemeral mesh network, in accordance with one embodiment.

FIG. 4 illustrates a block diagram of the functionality 400 of a node in an ephemeral mesh network, in accordance with one embodiment. As an option, the functionality 400 may be implemented in the context of the details of the previous figure and/or any subsequent figure(s). Of course, however, the functionality 400 may be implemented in the context of any desired environment. Further, the aforementioned definitions may equally apply to the description below.

As shown, functionality 400 of the node includes the transfer of data to/from the node upon registration, as well as the persistent storage of data relevant to the ephemeral mesh network by the node, as described above. The functionality 400 also includes unified message functionality that enables the node to perform functions in association with the ephemeral mesh network (e.g. extract topics, prepare geolocation map of nodes in the ephemeral mesh network, etc.), as shown. One of such unified message functionality includes calculating recommendation rank.

The node may include a Bubble-Up Algorithm for Calculating Recommendation Rank. The Recommendation Rank may be calculated in direct ratio to its vote values and inversely to its age according to the function shown in Table 4.

TABLE 4

$$RR = B_0 + \frac{\sum_{N=1}^{\infty} \frac{V}{(NOW_n - TS_n) * K}}{N}$$

$$RR_{fin} = \text{Max}(RR - RR_{min}, 0)$$

where:
RR = recommendation rank
$RR_{min}$ = minimal recommendation rank constant
$RR_{fin}$ = final recommendation rank
$B_0$ = base value constant (can be zero)
V is single vote value, for example, from 1 to 5
NOW is current time
TS is single vote timestamp
K is coefficient constant defining speed of recommendation aging
N is number of votes.

Figure 5:
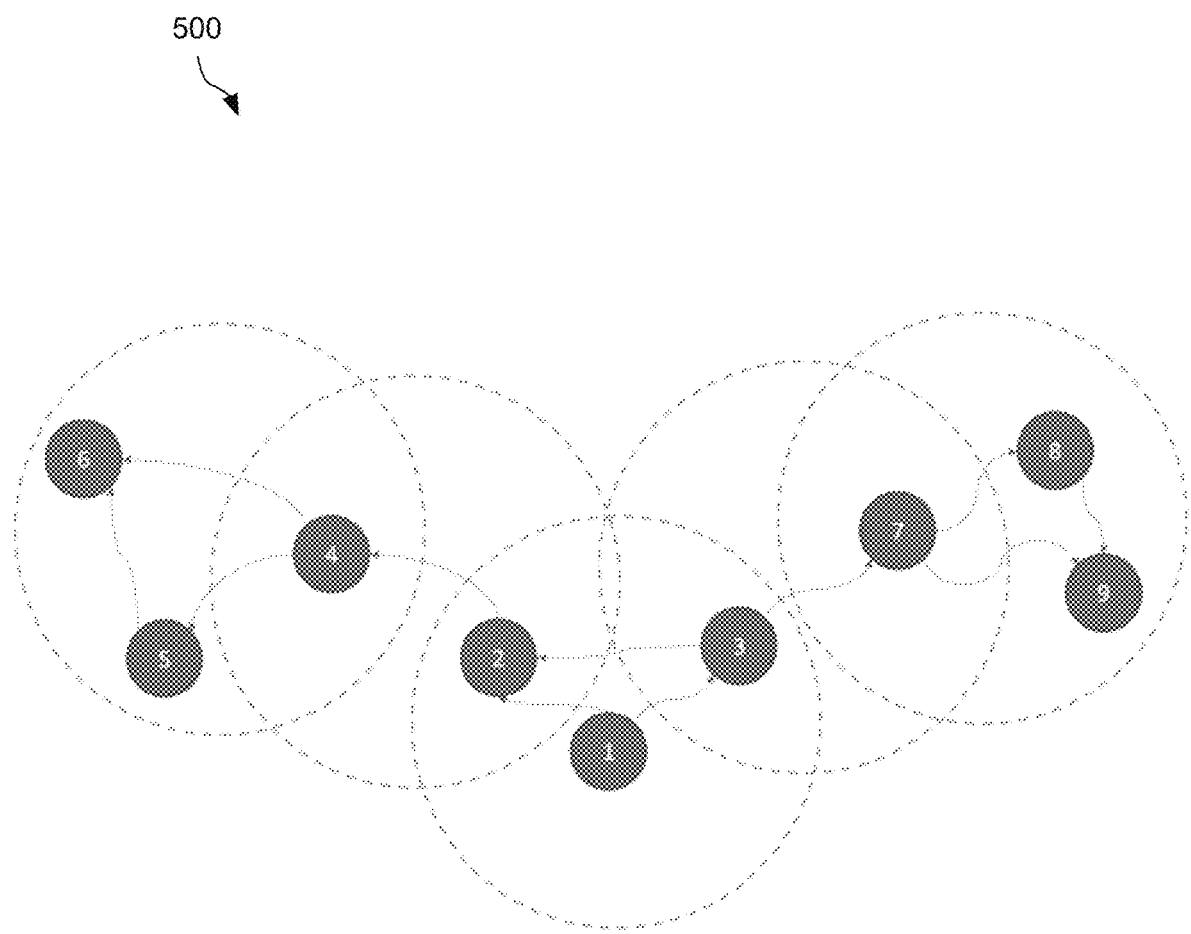
FIG. 5 illustrates a system diagram of using multi-casting for package routing between mesh access endpoints, in accordance with one embodiment.
Figure 6:
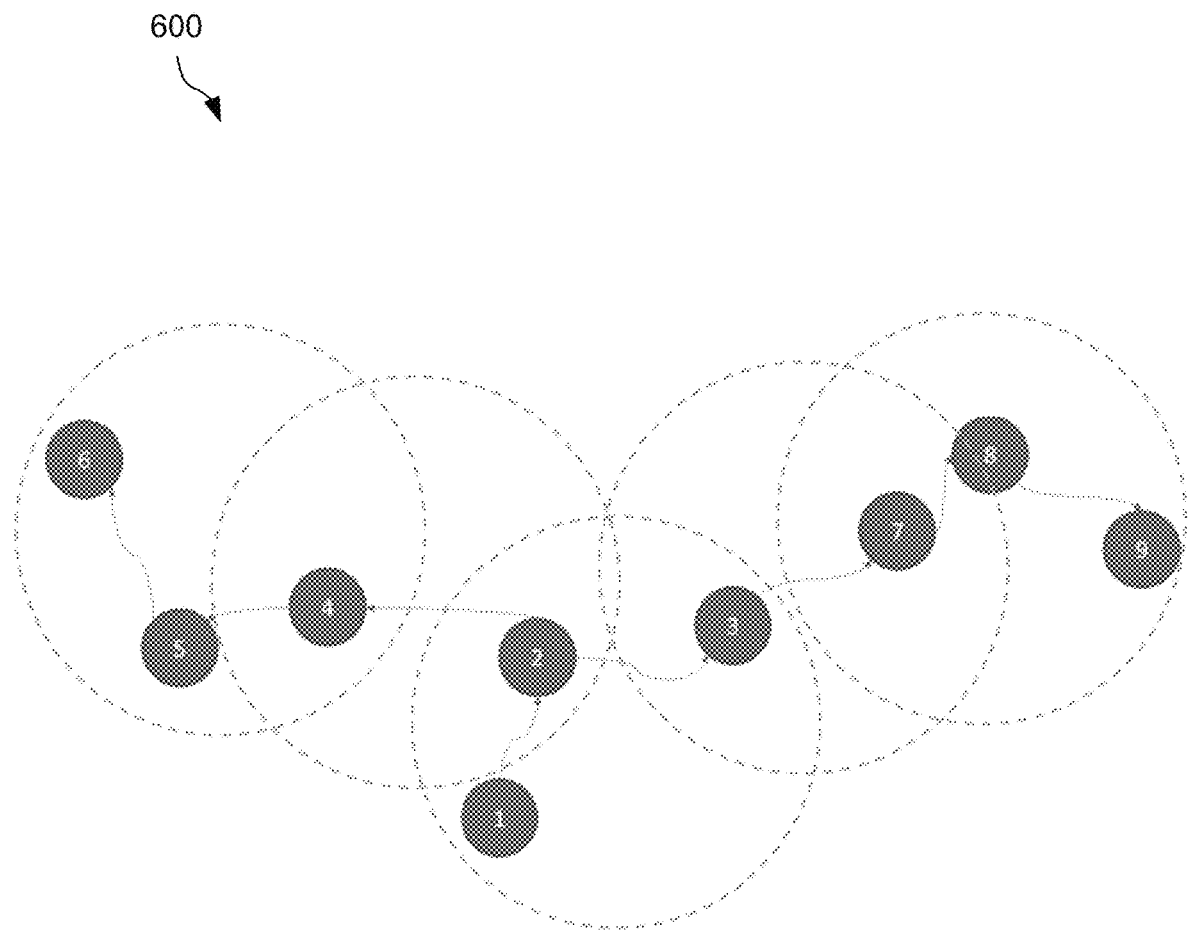
FIG. 6 illustrates a system diagram of using geolocation for package routing between mesh access endpoints, in accordance with one embodiment.

FIGS. 5 and 6 illustrate system diagrams of various package routing techniques 500, 600 between mesh access endpoints, in accordance with different embodiments. As an option, the package routing techniques 500, 600 may be implemented in the context of the details of the previous figure and/or any subsequent figure(s). Of course, however, the package routing techniques 500, 600 may be implemented in the context of any desired environment. Further, the aforementioned definitions may equally apply to the description below.

As described above, the nodes in the ephemeral mesh network may each include a mesh networking stack. Mesh networking stack can be based, as example, on RSocket stack that is a message passing network layer with fully duplex connection, enabled to model interactions like multicast and broadcast. The mesh networking stack may have a specialized network layer to implement package routing between mesh access endpoints, for example, based on multicasting (see FIG. 5) or utilizing geolocation data of each wireless device to minimize a total number of sent packages by sending a package via the shortest path (see FIG. 6).

For using multicasting: 1) the wireless device mesh node sends a package to all available in range nodes; 2) the package is resent delivering to destination node; 3) no package is sent to the sender node to prevent cycling processing; and 4) the destination node notifies available in range nodes on receiving the package, then nodes that did not resend the package yet will not resend it.

For using geolocation (as an op optimization to multicasting): 1) each mesh node periodically broadcasts data on its geolocation to all other nodes; and 2) a node sends a service request to the closest node calculated as per the known geolocation of all nodes.

MESH NETWORK CATEGORIES

Embodiments of the present disclosure support a wide range of possible environment categories.

Mesh Network of Wireless Devices in Cars on Highway

A separate mesh network of wireless devices in cars on highways can be created per each of two opposite traffic direction. Filtering a list of available access points can be done in two ways: by their geolocation offset for a short time, or by nearby location time that is very short for cars moving in opposite direction.

People in cars can broadcast messages of the message types shown in Table 5, which are inherited and overridden from unified messaging format and functionality.

TABLE 5

| | |
|---|---|
| 1. | Especially relevant for vehicle low density areas where average distance between vehicles exceeds Wi-Fi distance: |
| a. | Leave unified message for other drivers to a passed Wi-Fi device installed on road towers (light, electricity or any other available road installations along the road) |
| b. | Get relevant and not-expired unified message from a passed Wi-Fi device installed on road towers |
| 2. | Getting a road condition from a vehicle that drives in opposite direction and comes from a target point |
| 3. | Asking navigation assistance |
| 4. | Asking car fixing assistance |
| 5. | Notifying on the node location |
| 6. | Notifying on road condition |
| 7. | Notifying on nearby car disorder like open door, tire condition, lights, etc. |
| 8. | Notifying on police checkpoint |
| 9. | Notifying on speed camera |

Because of the multi-hop nature of a mesh network for this environment category, the mesh network can be stretched to many kilometers of highway, thus including numerous cars.

Hotel

Hotel guests can send the message types shown in Table 6, which may be inherited and overridden from unified messaging format and functionality.

TABLE 6

| | |
|---|---|
| 1. | Rating the hotel service |
| 2. | Notifying on the hotel-related tip |
| 3. | Recommending nearby place of interest |
| 4. | Asking assistance |

Café

Cafe guests can send the message types shown in Table 7, which may be inherited and overridden from unified messaging format and functionality.

TABLE 7

| | |
|---|---|
| 1. | Rating the cafe service |
| 2. | Notifying on the café-related tip |
| 3. | Recommending a dish |
| 4. | Asking on recommendation for another nearby cafe |

Plane

Plane passengers can send the message types shown in Table 8, which may be inherited and overridden from unified messaging format and functionality.

TABLE 8

| | |
|---|---|
| 1. | Rating the plane service |
| 2. | Notifying on the plane-related tip |
| 3. | Recommending a dish |
| 4. | Ask on recommendation for another nearby cafe |

Outdoor Game

Outdoor game participants can send the message types shown in Table 9, which may be inherited and overridden from unified messaging format and functionality.

TABLE 9

| | |
|---|---|
| 1. | Asking for a help |
| 2. | Rating the game |
| 3. | Notifying on actions |
| 4. | Notifying on the game-related tip |

Neighborhood

Neighbors can send the message types shown in Table 10, which may be inherited and overridden from unified messaging format and functionality.

TABLE 10

Rating the neighborhood service
Rating the city service
Notifying on the neighborhood event
Recommending a neighborhood-related tip
Ask for help

CONCLUSION

The embodiments described above close the gap of mesh networking by applying a unified messaging platform deployed on an ephemeral open ad-hoc mesh network. This platform is universal, unified and open for customizations for any environment category and may benefit from the following:
  Provides ubiquitous and unified messaging as per current environment category
  Does not require internet coverage
  Supports a hybrid swarm of wireless devices comprised of two sub swarms: one beyond broadband cellular network coverage and one with broadband cellular network coverage (internet access points, 4G, 5G, 6G, etc.)
  Can be applied to a wide range of environment categories;
  Can be customized for a specific environment category;
  Is suitable for mission-critical tasks in various environments;
  Utilizes minimal resources like personal wireless phones and optional range extenders;
  Does not have a single point of failure;
  Utilizes multi-hop message distribution model; and
  Is scalable.

Figure 7:
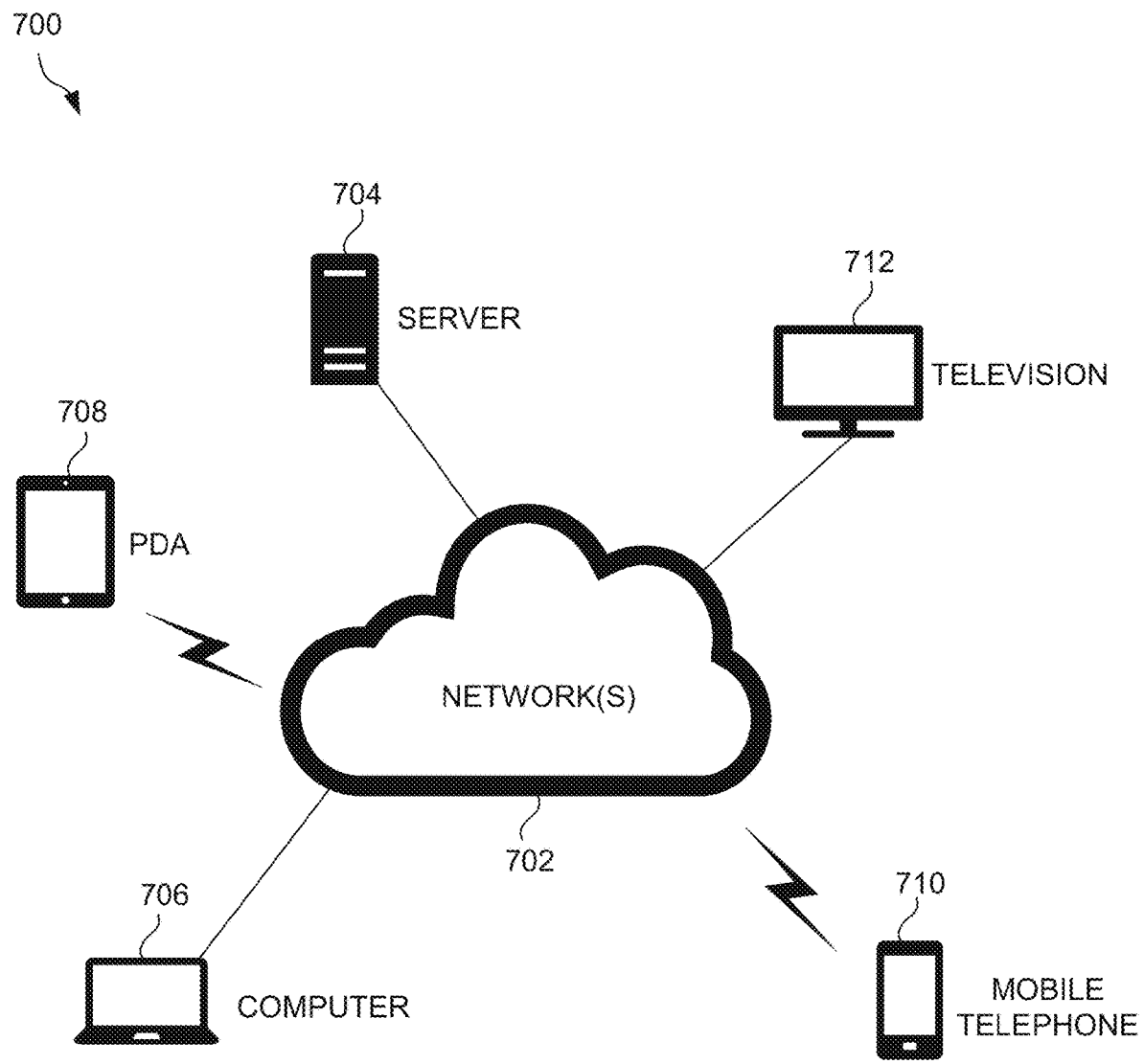
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
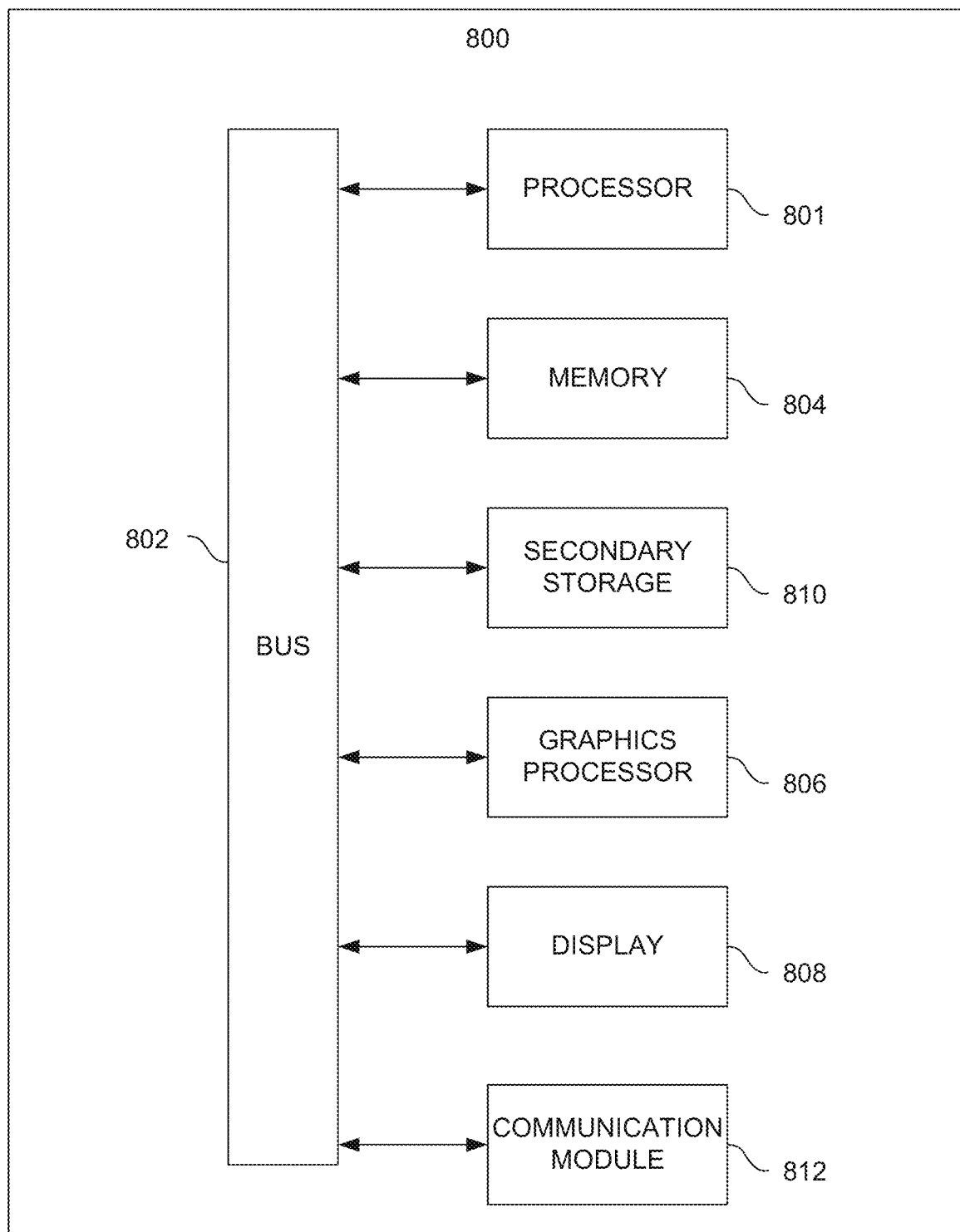
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a first mobile device cause the first mobile device to:
   identify, by the first mobile device, an environment category to which the first mobile device is registered;
   detect, by the first mobile device, a second mobile device that:
   is within a connectivity range of the first mobile device,
   is registered to the environment category to which the first mobile device is registered,
   is within a decentralized ad-hoc mesh network, and
   is in closest proximity to the first mobile device among all mobile devices within the decentralized ad-hoc mesh network;
   in response to detecting the second mobile device, establish, by the first mobile device, a connection with the decentralized ad-hoc mesh network by establishing a connection with the second mobile device;
   upon establishing the connection with the decentralized ad-hoc mesh network by establishing the connection with the second mobile device:
     receive historical data associated with the ad-hoc mesh network, by the first mobile device from the second mobile device that is configured to transmit to the first device the historical data that includes prior messages transmitted over the ad-hoc mesh network, prior recommendations communicated over the ad-hoc mesh network, and ratings given to the prior recommendations via the ad-hoc mesh network,
     receive, by the first mobile device, geolocation data for each other mobile device within the ad-hoc mesh network, and
     send, by the first mobile device, geolocation data of the first mobile device to each other mobile device within the ad-hoc mesh network;

communicate, by the first mobile device, with the mobile devices within the ad-hoc mesh network using a unified messaging protocol associated with the decentralized ad-hoc mesh network including at least:
(a) receiving, by the first mobile device, at least one new recommendation from at least one of the mobile devices within the ad-hoc mesh network,
(b) calculating, by the first mobile device, a recommendation rank for the at least one new recommendation using a formula that includes:

$$RR = B_0 + \frac{\sum_{N=1}^{\infty} \frac{V}{(NOW_n - TS_n) * K}}{N},$$

where:
RR=the recommendation rank,
$B_0$=a base value constant,
V is a single vote value within a predefined range of possible vote values,
NOW is a current time,
TS is a single vote timestamp,
K is a coefficient constant defining a speed of recommendation aging, and
N is number of votes, and
(c) communicating, by the first mobile device, a new message indicating the calculated recommendation rank to at least another one of the mobile devices within the ad-hoc mesh network.

2. The non-transitory computer-readable media of claim 1, wherein the environment category is one of a plurality of predefined environment categories.

3. The non-transitory computer-readable media of claim 1, wherein the plurality of predefined environment categories include at least one of a highway, a hotel, a restaurant, a school, or a neighborhood.

4. The non-transitory computer-readable media of claim 1, wherein the first mobile device is registered to the environment category upon selection of the environment category by a user of the first mobile device.

5. The non-transitory computer-readable media of claim 1, wherein the first mobile device includes a mesh networking stack that detects the second mobile device, establishes the connection with the second mobile device, and communicates with the at least the second mobile device using the unified messaging protocol associated with the decentralized ad-hoc mesh network.

6. The non-transitory computer-readable media of claim 1, wherein the decentralized ad-hoc mesh network relies on at least one of Wi-Fi, Bluetooth and a range extender, or broadband cellular network coverage.

7. The non-transitory computer-readable media of claim 1, wherein the unified messaging protocol includes a unified messaging format.

8. The non-transitory computer-readable media of claim 7, wherein the unified messaging format requires for each message an indication of:
a relevant environment category,
attributes of the message sender,
an address of each message receiver,
a message type, and
a message content.

9. The non-transitory computer-readable media of claim 1, wherein the unified messaging protocol supports unified messaging functionality.

10. The non-transitory computer-readable media of claim 9, wherein the unified messaging functionality includes:
asking a question to other mobile devices in the decentralized ad-hoc mesh network,
sending a notification to other mobile devices in the decentralized ad-hoc mesh network,
and
sending a knowledge-based query to other mobile devices in the decentralized ad-hoc mesh network.

11. The non-transitory computer-readable media of claim 9, wherein the unified messaging functionality includes:
presenting recommendations received from other mobile devices in the decentralized ad-hoc mesh network,
presenting a map of geolocations of other mobile devices in the decentralized ad-hoc mesh network, and
presenting messaging features from persisted messages utilizing machine supervised and unsupervised machine learning.

12. The non-transitory computer-readable media of claim 9, wherein the unified messaging functionality is customized for the environment category.

13. The non-transitory computer-readable media of claim 1, wherein communicating with at least the second mobile device includes:
sending, by the first mobile device, a point-to-multipoint multicast messages to all other mobile devices registered to the environment category.

14. The non-transitory computer-readable media of claim 1, wherein communicating with at least the second mobile device includes:
sending, by the first mobile device, a point-to-multipoint multicast message to a subset of all other mobile devices registered to the environment category that meet a defined parameter.

15. The non-transitory computer-readable media of claim 1, wherein communicating with at least the second mobile device includes:
sending, by the first mobile device, a point-to-point unicast message to the second mobile device or another mobile device registered to the environment category, as uniquely identified by a specified attribute.

16. The non-transitory computer-readable media of claim 1, wherein the first mobile device is capable of being registered to a plurality of different environment categories and connected to a plurality of different decentralized ad-hoc mesh networks corresponding to the plurality of different environment categories.

17. The non-transitory computer-readable media of claim 1, wherein the prior messages include prior broadcasted messages.

18. A method, comprising:
at a first mobile device:
identifying, by the first mobile device, an environment category to which the first mobile device is registered;
detecting, by the first mobile device, a second mobile device that:
is within a connectivity range of the first mobile device,
is registered to the environment category to which the first mobile device is registered,
is within a decentralized ad-hoc mesh network, and
is in closest proximity to the first mobile device among all mobile devices within the decentralized ad-hoc mesh network;
in response to detecting the second mobile device, establishing, by the first mobile device, a connection with the decentralized ad-hoc mesh network by establishing a connection with the second mobile device;

upon establishing the connection with the decentralized ad-hoc mesh network by establishing the connection with the second mobile device:
- receiving historical data associated with the ad-hoc mesh network, by the first mobile device from the second mobile device that is configured to transmit to the first device the historical data that includes prior messages transmitted over the ad-hoc mesh network, prior recommendations communicated over the ad-hoc mesh network, and ratings given to the prior recommendations via the ad-hoc mesh network,
- receiving, by the first mobile device, geolocation data for each other mobile device within the ad-hoc mesh network, and
- sending, by the first mobile device, geolocation data of the first mobile device to each other mobile device within the ad-hoc mesh network;

communicating, by the first mobile device, with the mobile devices within the ad-hoc mesh network using a unified messaging protocol associated with the decentralized ad-hoc mesh network including at least:
(a) receiving, by the first mobile device, at least one new recommendation from at least one of the mobile devices within the ad-hoc mesh network,
(b) calculating, by the first mobile device, a recommendation rank for the at least one new recommendation using a formula that includes:

$$RR = B_0 + \frac{\sum_{N=1}^{\infty} \frac{V}{(NOW_n - TS_n)*K}}{N},$$

where:
- RR=the recommendation rank,
- $B_0$=a base value constant,
- V is a single vote value within a predefined range of possible vote values,
- NOW is a current time,
- TS is a single vote timestamp,
- K is a coefficient constant defining a speed of recommendation aging, and
- N is number of votes, and (c) communicating, by the first mobile device, a new message indicating the calculated recommendation rank to at least another one of the mobile devices within the ad-hoc mesh network.

19. A first mobile device, comprising:
a non-transitory memory storing instructions; and
one or more processors in communication with the non-transitory memory that execute the instructions to:
identify, by the first mobile device, an environment category to which the first mobile device is registered;
detect, by the first mobile device, a second mobile device that:
- is within a connectivity range of the first mobile device,
- is registered to the environment category to which the first mobile device is registered,
- is within a decentralized ad-hoc mesh network, and
- is in closest proximity to the first mobile device among all mobile devices within the decentralized ad-hoc mesh network;

in response to detecting the second mobile device, establish, by the first mobile device, a connection with the decentralized ad-hoc mesh network by establishing a connection with the second mobile device;

upon establishing the connection with the decentralized ad-hoc mesh network by establishing the connection with the second mobile device:
- receive historical data associated with the ad-hoc mesh network, by the first mobile device from the second mobile device that is configured to transmit to the first device the historical data that includes prior messages transmitted over the ad-hoc mesh network, prior recommendations communicated over the ad-hoc mesh network, and ratings given to the prior recommendations via the ad-hoc mesh network,
- receive, by the first mobile device, geolocation data for each other mobile device within the ad-hoc mesh network, and
- send, by the first mobile device, geolocation data of the first mobile device to each other mobile device within the ad-hoc mesh network;

communicate, by the first mobile device, with the mobile devices within the ad-hoc mesh network using a unified messaging protocol associated with the decentralized ad-hoc mesh network including at least:
(a) receiving, by the first mobile device, at least one new recommendation from at least one of the mobile devices within the ad-hoc mesh network,
(b) calculating, by the first mobile device, a recommendation rank for the at least one new recommendation using a formula that includes:

$$RR = B_0 + \frac{\sum_{N=1}^{\infty} \frac{V}{(NOW_n - TS_n)*K}}{N},$$

where:
- RR=the recommendation rank,
- $B_0$=a base value constant,
- V is a single vote value within a predefined range of possible vote values,
- NOW is a current time,
- TS is a single vote timestamp,
- K is a coefficient constant defining a speed of recommendation aging, and
- N is number of votes, and (c) communicating, by the first mobile device, a new message indicating the calculated recommendation rank to at least another one of the mobile devices within the ad-hoc mesh network.

* * * * *